J. W. HASBURG.
ART OF DECORATING VITRIFIED SURFACES.
APPLICATION FILED DEC. 22, 1914.
1,168,882.  Patented Jan. 18, 1916.
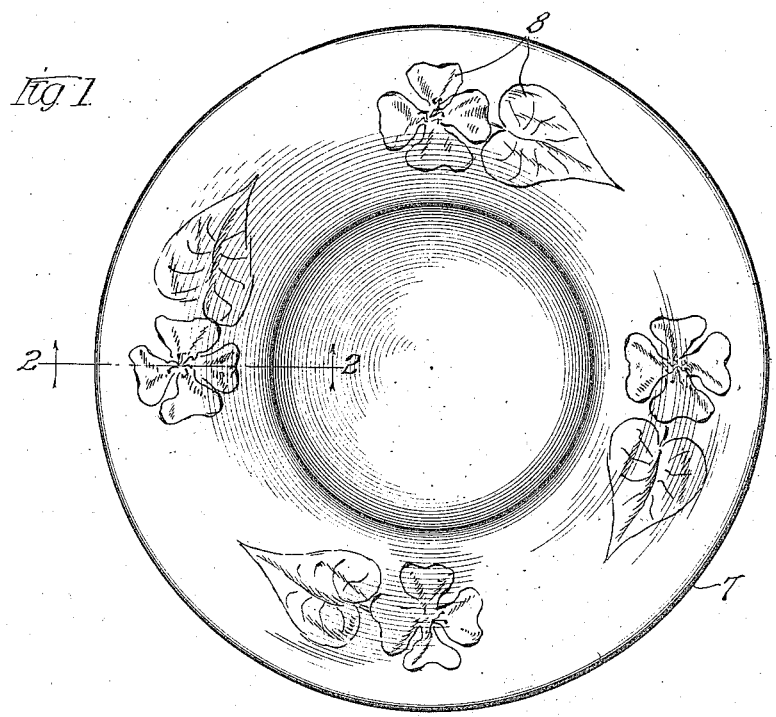
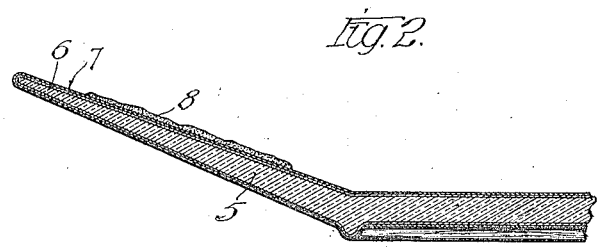

UNITED STATES PATENT OFFICE.

JOHN W. HASBURG, OF CHICAGO, ILLINOIS.

ART OF DECORATING VITRIFIED SURFACES.

1,168,882.   Specification of Letters Patent.   Patented Jan. 18, 1916.

Application filed December 22, 1914. Serial No. 878,560½.

*To all whom it may concern:*

Be it known that I, JOHN W. HASBURG, a citizen of the United States, residing at Chicago, in the county of Cook and State of Illinois, have invented certain new and useful Improvements in the Art of Decorating Vitrified Surfaces, of which the following is a specification.

This invention relates to improvements in the art of decorating vitrified surfaces, and more particularly to a composition and method of using the same, whereby such a surface is given a dull, paper-like coating to which pigments readily adhere and upon which they can be applied much more easily than on a glazed surface.

In the usual and well known manner of decorating articles having a vitrified or glazed surface a ceramic gold paint, pigment or other materials used to form the desired decoration are applied directly upon the smooth, glossy surface of the article, after which it is heated to a suitable temperature to cause the paint to adhere or fuse to the vitrified surface, this last step being commonly termed "firing." In the application of paint to vitrified articles, the glazed or glass like coating presents a surface poorly adapted to receive paint and therefore taxing the patience and skill of the artist.

One of the objects of my invention is to provide a temporary surface which will facilitate the work of the artist without in any way depreciating the artistic merit or lowering the commercial value of the finished product. Such a surface is obtained by applying to the vitrified surface, a fugitive coating which forms a paper like coating or matte upon which to apply the pigments and which is dissipated at a comparatively low temperature (for example about 700 degrees Fahrenheit) and therefore in no way interferes with the setting or fusing of the pigment on the vitreous surface at the higher temperatures used in firing such articles.

In carrying my invention into effect I prefer to use for the fugitive composition a coating having as a binder a material repellent to, or which has practically little if any affinity for the liquid contained in the paint. For example when oil is the vehicle used in the paint, the composition coating should contain as a binder a water soluble adhesive, so that the oil of the paint will not act as a solvent for the fugitive coating and so that it cannot affect or injure the paint.

As previously stated one desideratum is to obtain by means of the fugitive coating a surface upon which paint may readily be applied. This peculiar quality or property of some materials for facilitating the application of paint thereto can hardly be said to vary with the porosity of the material, and so for lack of a better term or expression I have described this quality as being "paper-like," since paper possesses this property in a very high degree.

For a specific disclosure of my invention I have chosen as a fugitive material to be applied on a vitrified surface which is to receive a paint having an oil vehicle, a composition comprising a weak solution of gum arabic and water, mixed with sufficient ammoniated mercury to leave on the surface, when the water has evaporated, a dull deposit having the appearance of calcimine. As a binder, I have found a solution of gum arabic in water to give excellent satisfaction though it is obvious that other adhesives soluble in water may be used. When the fugitive coating is to be used with paint having water as a vehicle it is necessary to use a binder repellent to water as for example a gum resin dissolved in a suitable volatile solvent.

From experiments I have found that mercurial compounds other than ammoniated mercury, commonly known as white precipitate, serve equally as well, for example an oxid of mercury, in giving the desired paper-like surface. Any of the above described coatings will disappear or volatilize at a relatively low temperature so that in firing the article in the usual manner all trace of this coating will disappear prior to the temperature reaching the relatively high degree necessary for fusing the vitrifiable colors. Before the desired high temperature necessary to properly fuse the vitrifiable colors has been reached, all evidence of the temporary coating will have entirely disappeared leaving the undecorated surface as before the application of the fugitive coating, and without in any way affecting the condition of the paint or the surface into which it is fused.

In the accompanying drawings Figure 1 shows a plate upon which my fugitive coating has been applied, the article being decorated and ready for firing. Fig. 2 is a section taken on line 2—2 of Fig. 1.

Referring to the drawing the numeral 5 indicates the body part of the article to be decorated. This article may be of china, porcelain, glass or other vitrified material, having a glazed surface 6. It is upon this glazed surface 6 that the pigments are usually applied. As has already been noted, the difficulty of applying paint upon a glossy smooth surface requires great skill and patience on the part of the artist and it is to eliminate this difficulty and facilitate the application of the paint that I have provided the fugitive coating previously described in detail. In the drawing the numeral 7 indicates the fugitive coating applied to the glazed surface 6. Vitrifiable paint 8 has been applied to the surface of the fugitive coating and the article as it now stands is ready for the firing or final step in the process.

Whereas I have referred particularly to the use of a mercurial compound, as the base or principal ingredient of my fugitive material, and from experiments I have found that this material is particularly well suited for this purpose, I have also found that certain other substances, as starch or benzoic acid, which readily volatilize and burn up when the article is fired, leaving no trace or perceptible ash, may be used with success. I therefore do not limit my invention to the use of the specific materials enumerated, as I am the first to apply to a glazed vitrified surface, to be decorated with a vitrifiable paint, a fugitive coating providing a paper-like surface highly adapted for the application of vitrifiable paints or other decorating material and which will disappear on the firing of the article.

Having described my invention, what I claim is:—

1. The art of decorating an article having a vitrified glazed surface with vitrifiable decorative materials which consists in applying to such surface a coating having a paper-like surface, said coating being volatilizable at temperaturee below the firing temperature of the vitrifiable colors; subsequently applying a vitrifiable decorative material on the coating; and firing the article to volatilize the coating and subsequently fuse the decorative material onto the vitrified surface.

2. The art of decorating an article having a vitrified glazed surface with vitrifiable decorative material which consists in applying to said surface a composition comprising, a solution of ammoniated mercury, water and a water soluble adhesive material, to provide a fugitive unglazed paper-like surface; subsequently applying a vitrifiable decorative material having a liquid vehicle repellent to the materials in said solution and subsequently firing the article to first dissipate the fugitive coating and then fuse the decorative material to the vitrified surface.

3. The art of decorating an article having a vitrified glazed surface with vitrifiable decorative material which consists in applying to said surface a composition comprising, ammoniated mercury, a liquid and a binder soluble in said liquid, to provide a fugitive unglazed paper-like surface; subsequently applying a vitrifiable decorative material having a liquid vehicle repellent to the materials in the aforesaid composition; and firing the article to volatilize the fugitive coating and then fusing the decorative material to the vitrified surface.

In testimony whereof I hereunto set my hand in the presence of two subscribing witnesses.

JOHN W. HASBURG.

In the presence of—
STANLEY W. COOK,
MARY F. ALLEN.